US011595895B2

(12) United States Patent
Jagannatha et al.

(10) Patent No.: US 11,595,895 B2
(45) Date of Patent: Feb. 28, 2023

(54) SYSTEMS AND METHODS FOR PROVIDING POWER SAVING PROFILES FOR USER EQUIPMENT

(71) Applicant: Verizon Patent and Licensing Inc., Basking Ridge, NJ (US)

(72) Inventors: Deepa Jagannatha, Bridgewater, NJ (US); Susan Wu Sanders, Bridgewater, NJ (US); Hui Zhao, Marlboro, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 17/186,645

(22) Filed: Feb. 26, 2021

(65) Prior Publication Data

US 2022/0279444 A1     Sep. 1, 2022

(51) Int. Cl.
*H04W 52/02*     (2009.01)
(52) U.S. Cl.
CPC .............................. *H04W 52/0225* (2013.01)
(58) Field of Classification Search
CPC ................................................ H04W 52/0225
See application file for complete search history.

(56) References Cited

U.S. PATENT DOCUMENTS

2020/0015312 A1* 1/2020 He ...................... H04W 76/28

FOREIGN PATENT DOCUMENTS

EP         2846589 A1 * 3/2015   ........ H04W 52/0216

* cited by examiner

*Primary Examiner* — Marisol Figueroa

(57) ABSTRACT

A base station may define power saving profiles, and may define, for the power saving profiles, sets of features and parameter settings for each feature of the sets of features. The base station may store the power saving profiles, the sets of features, and the parameter settings in a data structure, and may receive, from a user equipment, data identifying a service utilized by the user equipment or an operation mode of the user equipment. The base station may retrieve, from the data structure, a single power saving profile based on the data identifying the service utilized by the user equipment or the operation mode of the user equipment, and may enable, for the user equipment, a corresponding set of features and corresponding parameter settings of the single power saving profile based on the single power saving profile being retrieved from the data structure.

20 Claims, 11 Drawing Sheets

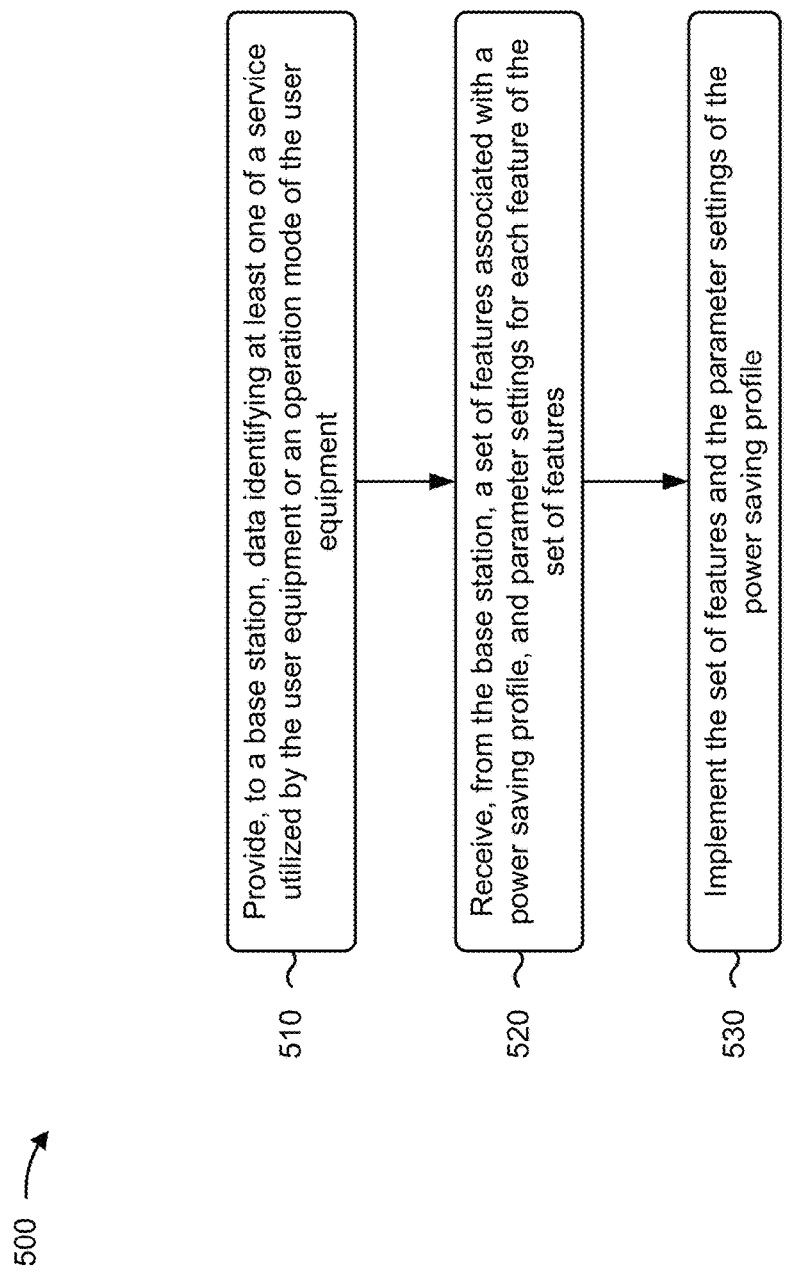

SYSTEMS AND METHODS FOR PROVIDING POWER SAVING PROFILES FOR USER EQUIPMENT

BACKGROUND

A power save mode (PSM) is a feature of a user equipment (UE) that may turn off a transceiver of the UE and puts the UE to "sleep" without the UE having to re-attach to a network when the UE next wakes up. Similarly, extended discontinuous reception (eDRX) is a power saving feature that can be used by a UE to also reduce power consumption. eDRX can be used without PSM or in conjunction with PSM to obtain additional power savings.

BRIEF DESCRIPTION OF THE DRAWINGS

FIGS. 4 and 5 are flowcharts of example processes for providing power saving profiles for a UE.

DETAILED DESCRIPTION OF PREFERRED EMBODIMENTS

Figure 1A:
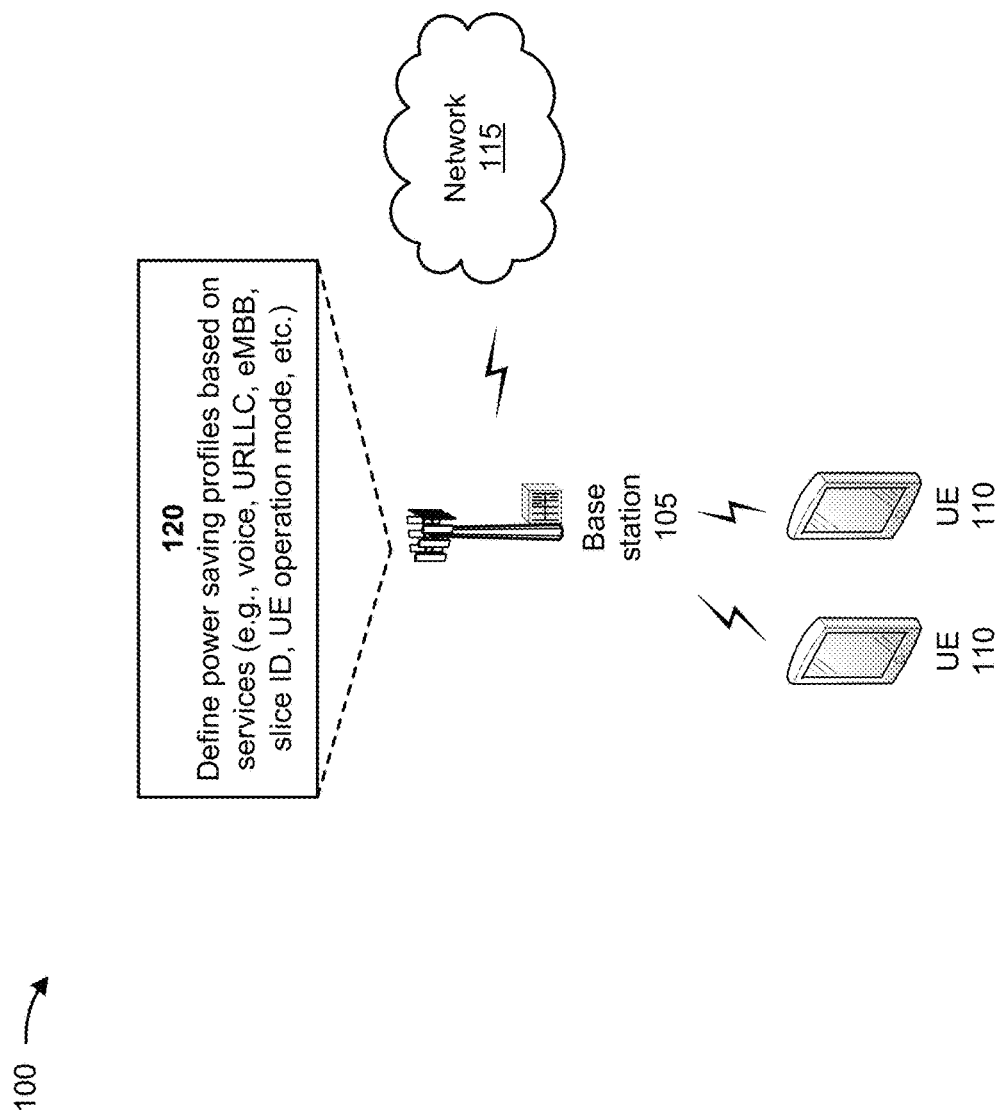
FIGS. 1A-1G are diagrams of an example associated with providing power saving profiles for a UE.

The following detailed description of example implementations refers to the accompanying drawings. The same reference numbers in different drawings may identify the same or similar elements.

For fifth generation (5G) New Radio (NR) standalone (SA) and non-standalone (NSA) technology, managing UE power consumption (e.g., via PSM, eDRX, and/or the like) becomes more challenging and more critical than fourth generation (4G) long term evolution (LTE) technology. For example, superfast speeds on 5G can lead to more UE power consumption compared to lower data rate transmissions. Ultra-reliable low latency communication (URLLC) applies stringent requirements on how long a UE can be in a discontinuous reception mode, which may limit an UE's ability to decrease UE power consumption. 5G NR NSA, which utilizes both LTE and NR technologies, requires both an LTE modem and a 5G NR modem to be turned on, also resulting in increased power consumption relative to utilizing a single modem. Although 5G technology provides a rich set of features, 5G technology also provides new challenges for managing UE power consumption.

Some implementations described herein include a base station that provides, to a UE, power saving profiles for managing UE power consumption. For example, the base station may define power saving profiles based on network services provided by a network associated with the base station. The base station may define, for the power saving profiles, sets of features and parameter settings for each feature of the sets of features. Each power saving profile may define a set of features that include parameter settings for enabling power saving features for the UE. The base station may store the power saving profiles, the sets of features, and the parameter settings in a data structure (e.g., a database, a table, a list, and/or the like). The base station may receive, from the UE, data identifying a service utilized by the UE and/or an operation mode of the UE. The base station may retrieve, from the data structure, a single power saving profile or multiple power saving profiles based on the data identifying the service utilized by the UE and/or the operation mode of the UE. For example, the base station may retrieve the single power saving profile when the UE utilizes a first quantity of services and may retrieve multiple power saving profiles when the UE utilizes a second, greater quantity of services.

The base station may enable, for the UE, a corresponding set of features and corresponding parameter settings of the single power saving profile based on the single power saving profile being retrieved from the data structure. When the multiple power saving profiles are retrieved from the data structure, the base station may combine features of corresponding sets of features and corresponding parameter settings of the multiple power saving profiles to generate a new set of features and new parameter settings. The base station may enable, for the UE, the new set of features and the new parameter settings.

In this way, the base station provides power saving profiles for a UE. The base station may enable different power saving features based on services received by the UE or an operation mode of the UE. The base station may establish multiple power saving profiles for UEs, such as a power saving profile for a voice-only service, a power saving profile for URLLC, a power saving profile for enhanced mobile broadband (eMBB), a power saving profile for a specific network slice, a power saving profile for an operation mode (e.g., a UE operating on a direct power source or on a battery), and/or the like. In this way, the base station may enable UEs to efficiently and automatically manage power consumption.

FIGS. 1A-1G are diagrams of an example 100 associated with providing power saving profiles to UEs. As shown in FIGS. 1A-1G, example 100 includes a base station 105 associated with UEs 110 and a network 115. Each of UEs 110 may include a wireless communication device, a mobile phone, a laptop computer, a tablet computer, a desktop computer, an IoT device, and/or the like. Each base station 105 may include an eNodeB (eNB), a gNodeB (gNB), and/or the like that provides cellular communications. Network 115 may include a radio access network (RAN) or a core network associated with a LTE or 4G network, a NR or 5G network, and/or the like.

As shown in FIG. 1A, and by reference number 120, the base station 105 defines power saving profiles based on services. For example, the base station 105 may determine services associated with network 115 based on accessing a data structure storing information identifying one or more services associated with the network 115. The base station 105 may define one or more power saving profiles based on the one or more services associated with the network 115. For example, the base station 105 may define a set of power saving profiles that may include a power saving profile for a voice service, a power saving profile for URLLC, a power saving profile for eMBB, a power saving profile for a network slice, a power saving profile for the operation mode of the UE 110, a power saving profile for a network service associated with a 5G NR network, and/or a power saving mode for a network service associated with a 4G LTE network.

In some implementations, a power saving profile, may be defined based on a service and may include information identifying a feature of the service to be utilized by a UE 110 to enable the UE 110 to reduce power consumption. For example, a power saving profile defined based on URLLC may include information indicating that the UE 110 is to continue to utilize standalone technology and/or is to transition from non-standalone technology to standalone technology when the UE 110 is located in an area in which standalone technology and non-standalone technology can be utilized by the UE 110, that the UE 110 is to utilize connected mode discontinuous reception (CDRX), that the UE 110 is to utilize discontinuous reception (DRX), that the UE 110 is to utilize extended discontinuous reception (eDRX), and/or the like. As another example, a power saving profile defined based on eMBB may include information indicating that the UE 110 is to remain on non-standalone technology when the UE 110 is located in an area with standalone technology and the non-standalone technology based on a data rate provided by the non-standalone technology being greater data rate than a data rate provided by the standalone technology, that the UE 110 is to utilize CDRX, and/or the like.

In some implementations, a power saving profile is defined based on a single service. For example, base station 105 may define a power saving profile for voice only service, a power saving profile for URLLC, a power saving profile for eMBB, a power saving profile for a particular network slice, a power saving profile for a UE 110 operating on a direct power source, a power saving profile a UE 110 operating on a battery, and/or the like.

In some implementations, a power saving profile may be associated with multiple services. In some implementations, the base station 105 generates the power saving profile associated with the multiple services based on combining multiple power saving profiles associated with a single service. The base station 105 may define a set of rules for combining multiple power saving profiles associated with a single service to generate the power saving profile associated with the multiple services, as described in greater detail below.

Figure 1B:
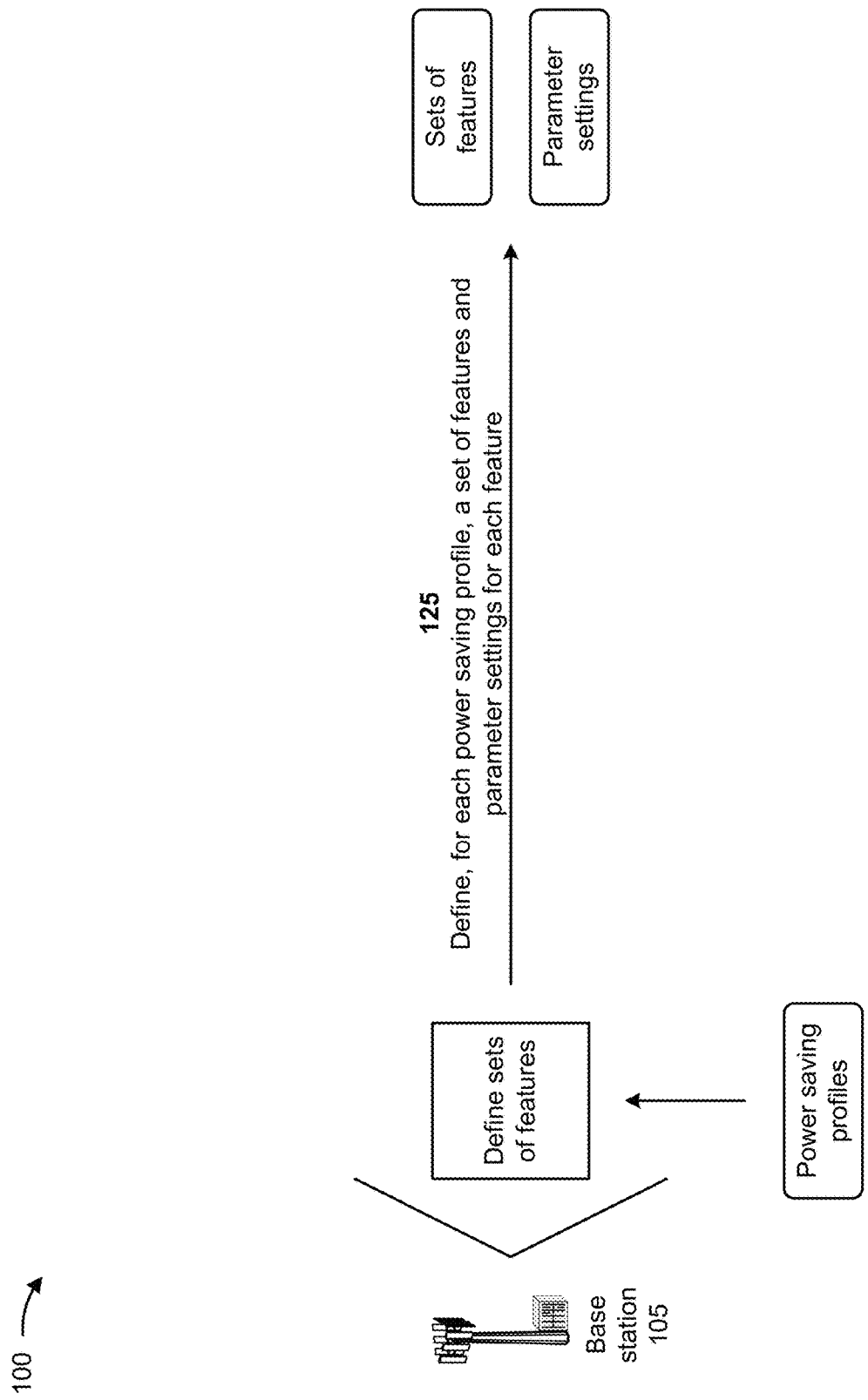

As shown in FIG. 1B, and by reference number 125, the base station 105 defines, for each power saving profile, a set of features and parameter settings for each feature of the set of features. As an example, the set of features for a power saving profile may include a set of features associated with CDRX, a set of features associated with DRX, a set of features associated with eDRX, and/or the like.

Figure 1C:
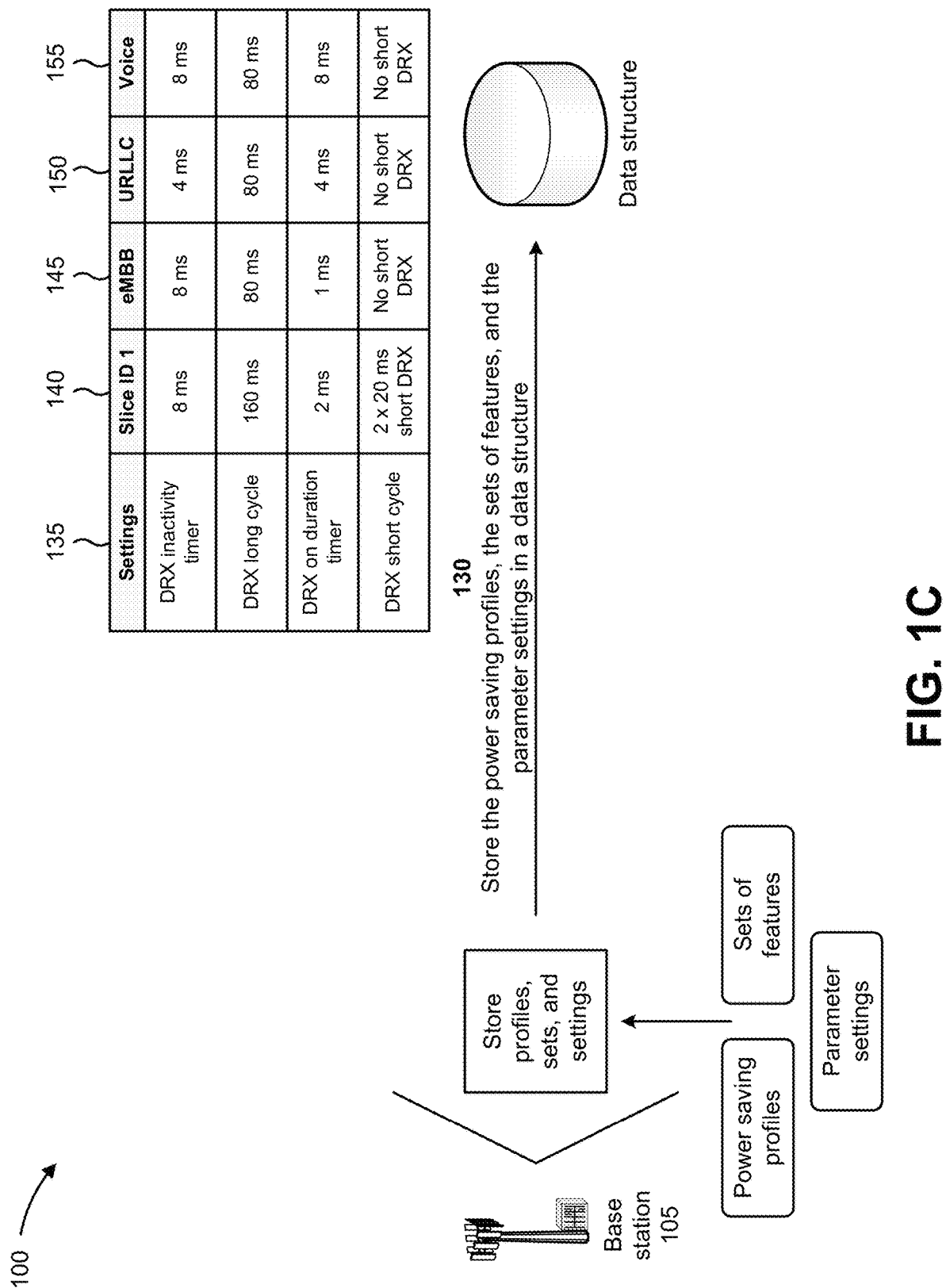

In some implementations, the set of features and parameter settings for a power saving profile may be stored in a data structure. As shown in FIG. 1C, data structure may comprise a table. A first column 135 of the table may store information identifying a set of features associated with a power saving profile. A second column 140 may store information identifying parameter settings for the set of features for a particular network slice (e.g., a network slice associated with an identifier Slice ID 1, as shown in FIG. 1C). A third column 145 may store information identifying parameters settings for the set of features for eMBB. A fourth column 150 may store information identifying parameters settings for the set of features for URLLC. A fifth column 155 may store information identifying parameters settings for the set of features for a voice service.

Figure 1D:
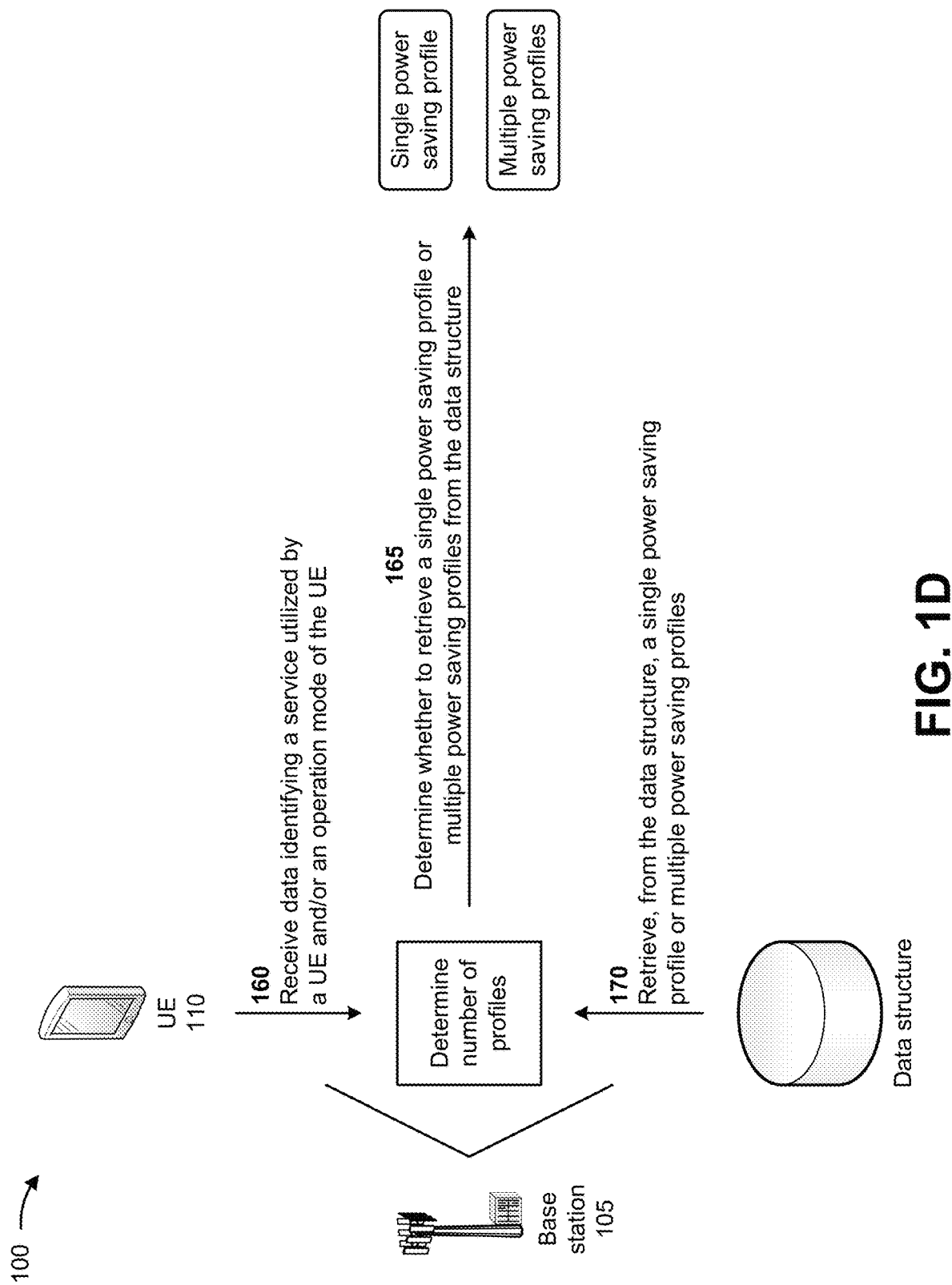

As shown in FIG. 1D, and by reference number 160, the base station 105 receives data identifying a service (e.g., a voice service, URLLC, eMBB, and/or the like) utilized by a UE 110 and/or an operation mode (e.g., a first operation mode associated with the UE 110 utilizing a direct power source and/or a second operation mode associated with the UE 110 utilizing a battery) of the UE 110. The base station 105 may receive the data identifying the service utilized by the UE 110 and/or the operation mode of the UE 110 periodically, in response to a request, based on the occurrence of an event (e.g., the UE 110 attaching to the base station 105), and/or the like.

In some implementations, the base station 105 determines that the UE 110 is subscribed to a power management service based on receiving the data identifying the service from the UE 110. As an example, the data identifying the service may include an identifier (e.g., a mobile device number (MDN), an international mobile equipment identity (IMEI), a temporary mobile subscriber identity (TMSI), a media access control (MAC) address, a service set identifier (SSID), and/or the like) associated with UE 110. The base station 105 may determine that the UE 110 is subscribed to the power management service based on accessing a data structure storing information mapping identifiers to information identifying services subscribed to by UE 110. The base station 105 may determine to obtain one or more power saving profiles from the data structure based on the UE 110 being subscribed to the power management service.

As shown by reference number 165, the base station 105 determines whether to retrieve a single power saving profile or multiple power saving profiles from the data structure. The base station 105 may determine whether to retrieve a single power saving profile or multiple power saving profiles based on the data identifying the service and/or the operation mode. For example, the base station 105 may determine whether to retrieve a single power saving profile or multiple power saving profiles based on a quantity of services enabled for the UE 110 and/or based on whether the UE 110 is utilizing a direct power source or a battery. In some implementations, the base station 105 determines to retrieve the single power saving profile when the data identifying the service indicates that a first quantity of services (e.g., one service) is enabled for the UE 110 and/or when the UE 110 is utilizing a direct power source. In some implementations, the base station 105 determines to retrieve multiple power saving profiles when the data identifying the service indicates a second quantity of services (e.g., two services) and/or when the UE 110 is utilizing a battery. As shown by reference number 170, the base station 105 may retrieve, from the data structure, a single power saving profile or multiple power saving profiles.

Figure 1E:
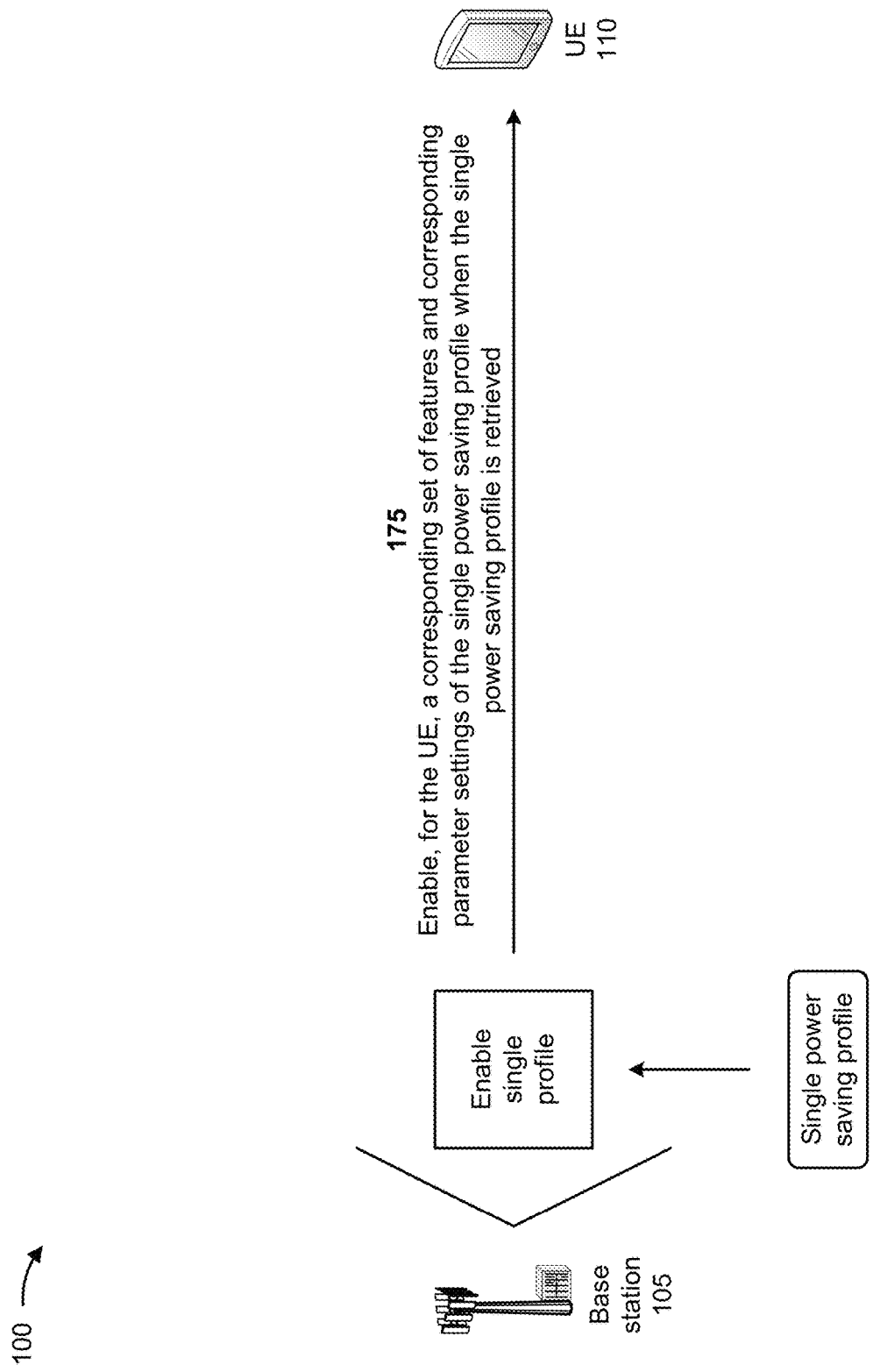

In some implementations, the base station 105 retrieves a single power saving profile. As shown in FIG. 1E, and by reference number 175, the base station 105 enables, for the UE 110, a corresponding set of features and corresponding parameter settings of the single power saving profile when the single power saving profile is retrieved. For example, the base station 105 may provide the single power saving profile to the UE 110 to enable the UE 110 to utilize the single power saving profile to manage power consumption.

Figure 1F:
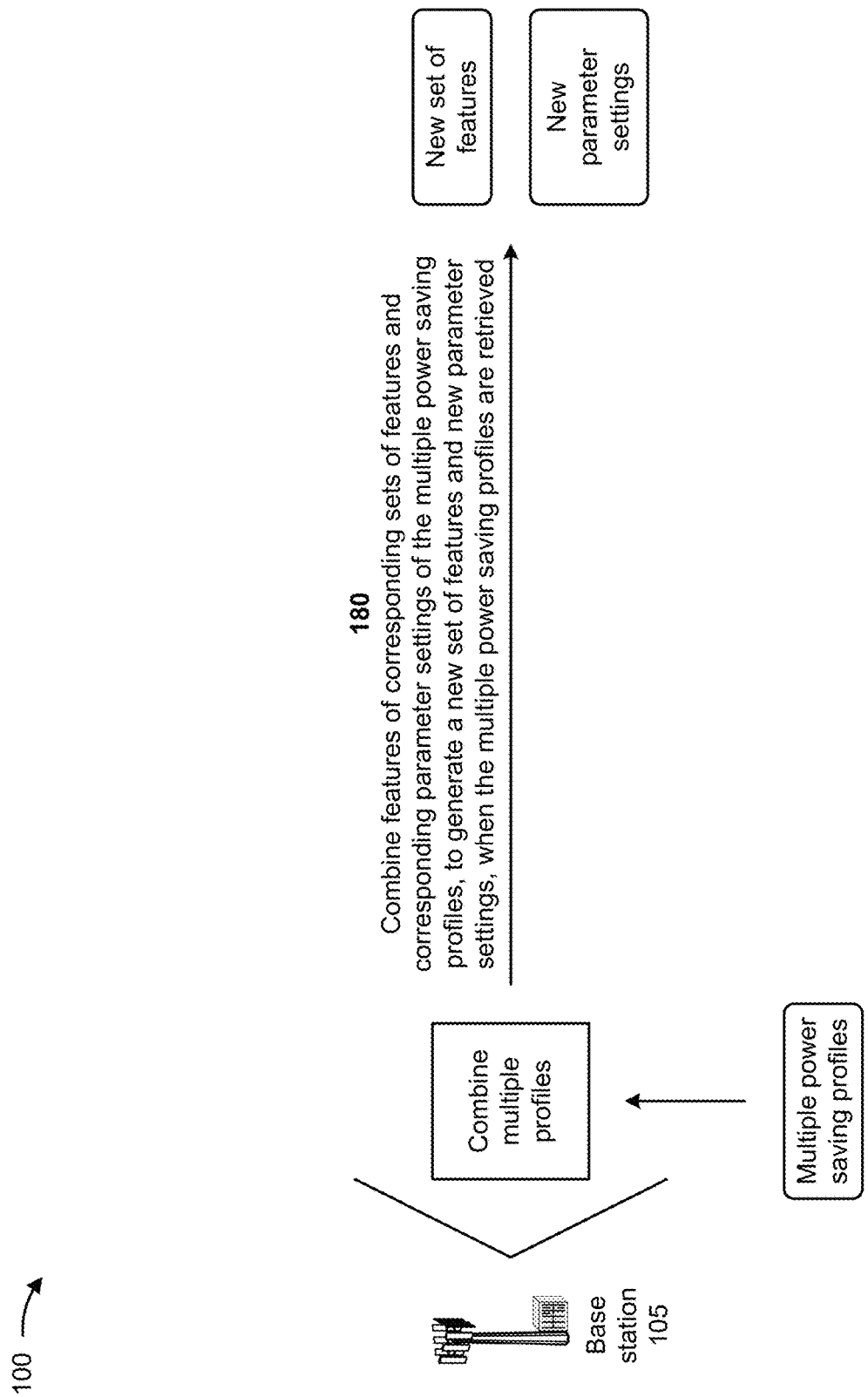

In some implementations, the base station 105 retrieves multiple power saving profiles. As shown in FIG. 1F, and by reference number 180, the base station 105 combines features of corresponding sets of features and corresponding parameter settings of the multiple power saving profiles, to generate a new set of features and new parameters settings, when the multiple power saving profiles are retrieved.

In some implementations, the base station 105 may apply a rule that causes the combining of the features of the corresponding sets of features and the corresponding parameter settings of the multiple power saving profiles, to generate the new set of features and the new parameter settings. In some implementations, the base station 105 includes each unique feature (e.g., a feature included in a single power saving profile) and the corresponding parameter settings in the new set of features and the new parameter settings based on applying the rule. In some implementations, the base station 105 includes common features (e.g., a feature included in two or more power saving profiles) having the same parameter settings in the new set of features and the new parameter settings based on applying the rule.

In some implementations, the base station 105 identifies a conflicting feature (e.g., a feature having a first parameter setting in a first power saving profile and a second parameter setting in a second power saving profile) in the features of corresponding sets of features and corresponding parameter settings of the multiple power saving profiles. In some implementations, the base station 105 includes the conflicting feature and one of the parameter settings (e.g., the first parameter setting or the second parameter setting) for the conflicted feature based on applying the rule. As an example, the base station 105 may assign a priority to each of the power saving profiles relative to the other power saving profiles. The base station 105 may assign the priority to a power saving profile based on a reduction in power consumption associated with the power saving profile, relative to reductions in power consumptions associated with other power saving profiles, a service associated with the power saving profile, and/or the like. The base station 105 may include the conflicting feature and the parameter setting of the conflicting feature associated with the power saving profile having the highest priority relative to the other power saving profiles in the new set of features and the new parameter settings.

Alternatively, and/or additionally, the base station 105 may apply weights to the multiple power saving profiles (e.g., to the priorities associated with the multiple power saving profiles) to generate multiple weighted power saving profiles. The base station 105 may combine the features of the corresponding sets of features and the corresponding parameter settings, based on the multiple weighted power saving profiles, to generate the new set of features and the new parameter settings, in a manner similar to that described above.

In some implementations, the base station 105 includes the conflicting feature and new parameter settings for the conflicted feature based on applying the rule. For example, the base station 105 may include the conflicting feature and a parameter setting corresponding to an average value, a median value, a mode value, and/or the like of the values of the parameters for the conflicting feature based on applying the rule.

Figure 1G:
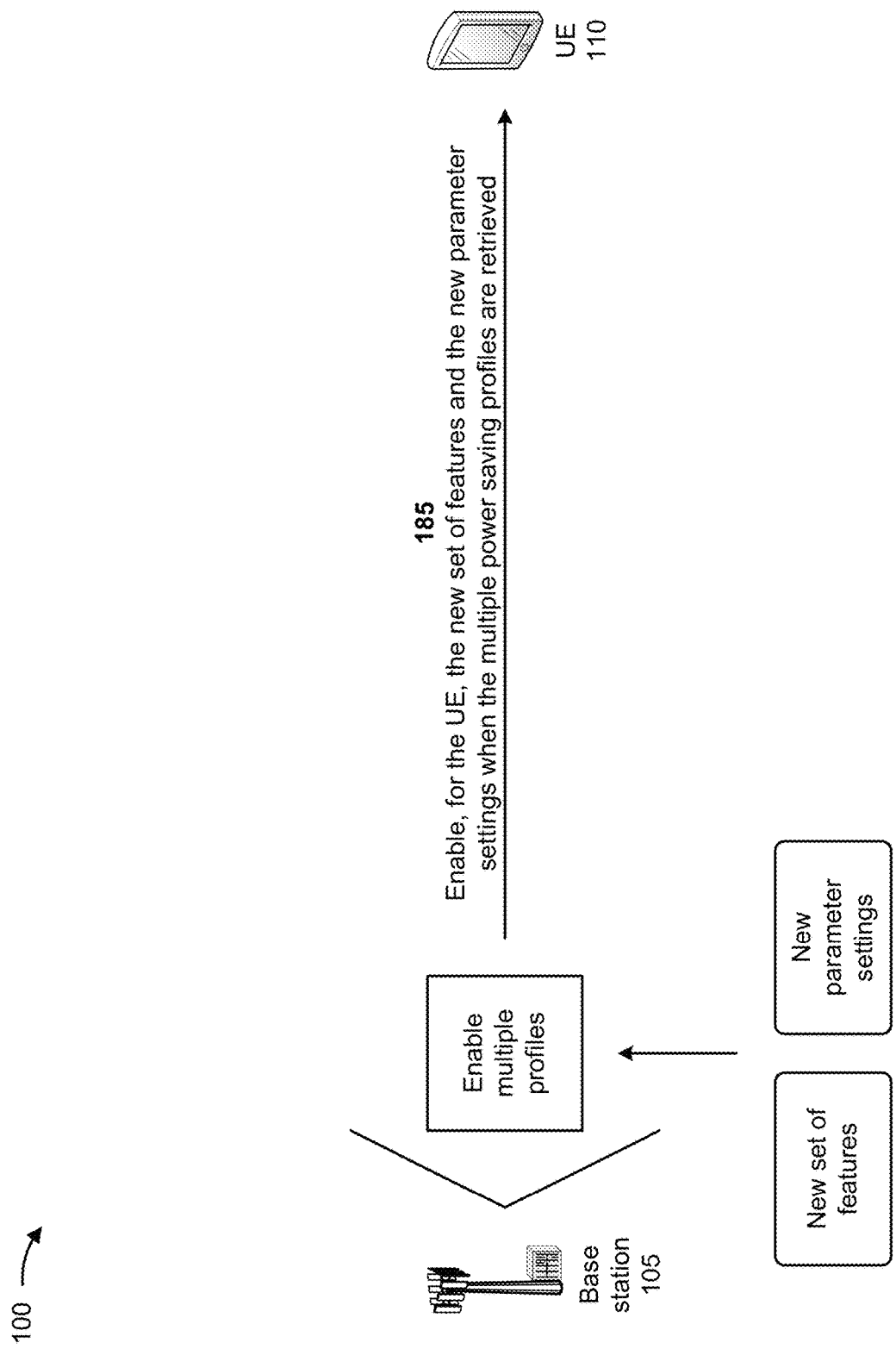

As shown in FIG. 1G, and by reference number 185, the base station 105 enables, for the UE 110, the new set of features and the new parameter settings when the multiple power saving profiles are retrieved. For example, the base station 105 may provide the new set of features and the new parameter settings to the UE 110 to enable the UE 110 to utilize the new set of features and the new parameter setting to manage power consumption.

In this way, base station 105 provides power saving profiles for a UE 110. Base station 105 may enable different power saving features based on services received by UE 110 or an operation mode of UE 110. Base station 105 may establish multiple power saving profiles for UEs 110, such as a power saving profile for a voice-only service, a power saving profile for URLLC, a power saving profile for eMBB, a power saving profile for a network slice, a power saving profile for the operation mode of UE 110, and/or the like. Each power saving profile may define a set of features that include parameter settings for enabling power saving features for UEs 110. Thus, base station 105 conserves computing resources, networking resources, losing network traffic due to low batteries, attempting to attach and re-attach with UEs 110 experiencing poor power consumption, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
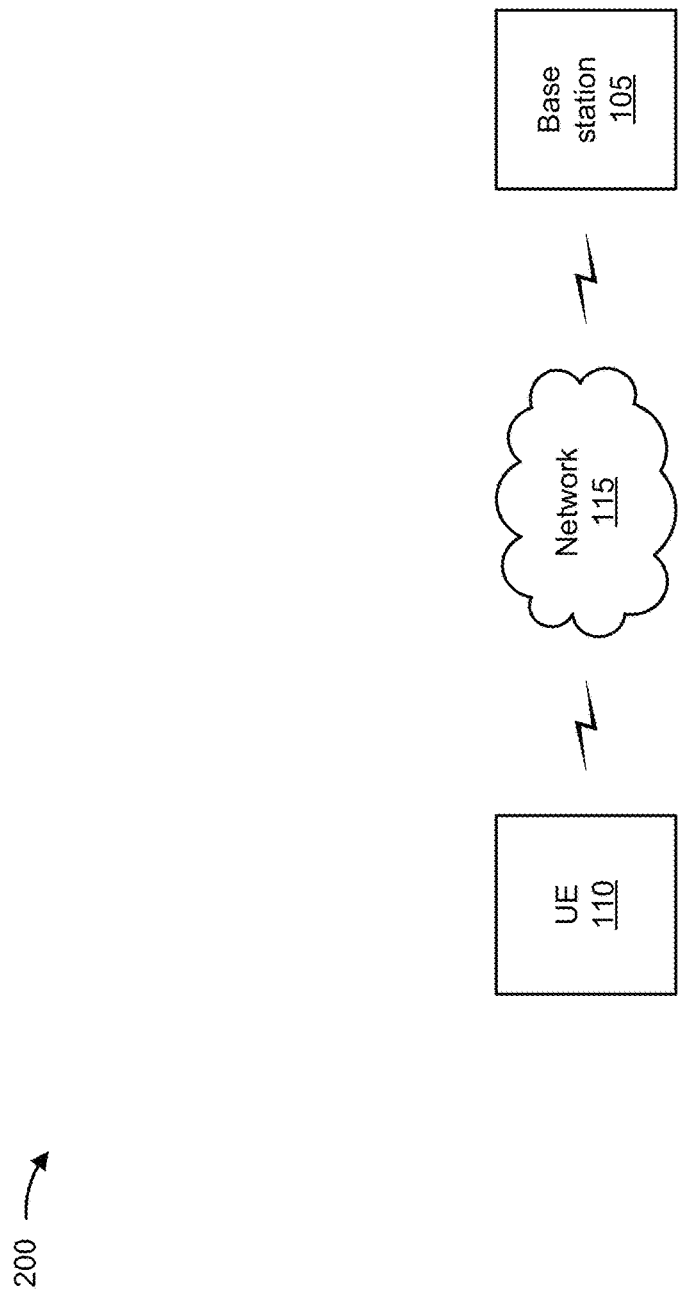
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include UE 110, base station 105, and/or network 115. Devices and/or elements of environment 200 may interconnect via wired connections and/or wireless connections.

UE 110 includes one or more devices capable of receiving, generating, storing, processing, and/or providing information, as described elsewhere herein. UE 110 may include a communication device and/or a computing device. For example, UE 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an Internet of Things (IoT) device, or a similar type of device.

Base station 105 includes one or more devices capable of transferring traffic, such as audio, video, text, and/or other traffic, destined for and/or received from UE 110. For example, base station 105 may include an eNB, a gNB, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another device capable of supporting wireless communication.

Network 115 may include a core network or a RAN that includes one or more base stations 105 that take the form of eNBs, gNBs, and/or the like, via which a user device (e.g., a mobile phone, a laptop computer, a tablet computer, a desktop computer, and/or the like) communicates with a core network. Network 115 may include one or more wired and/or wireless networks. For example, network 115 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
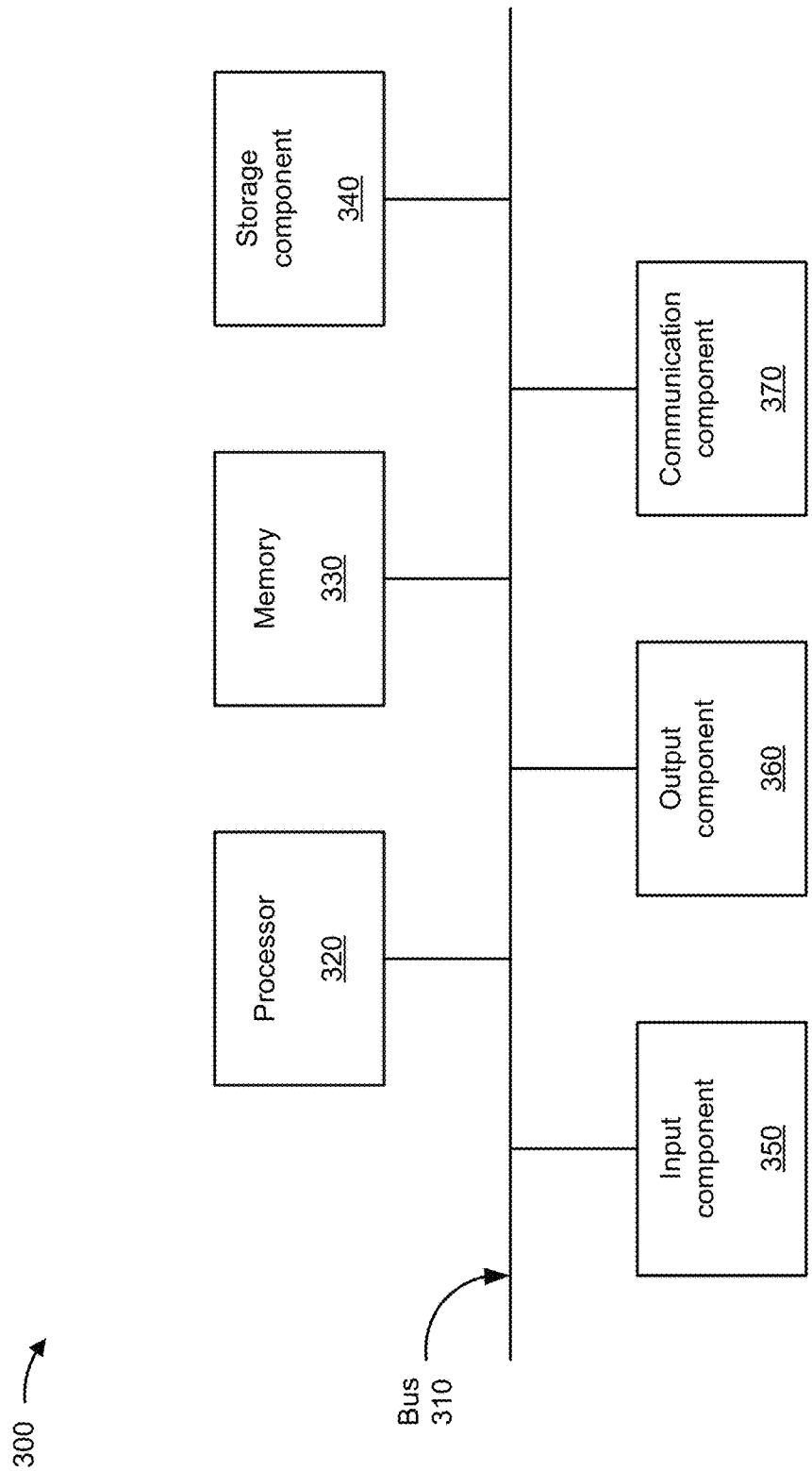
FIG. 3 is a diagram of example components of one or more devices of FIG. 2.

FIG. 3 is a diagram of example components of a device 300, which may correspond to UE 110 and/or base station 105. In some implementations, UE 110 and/or base station 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
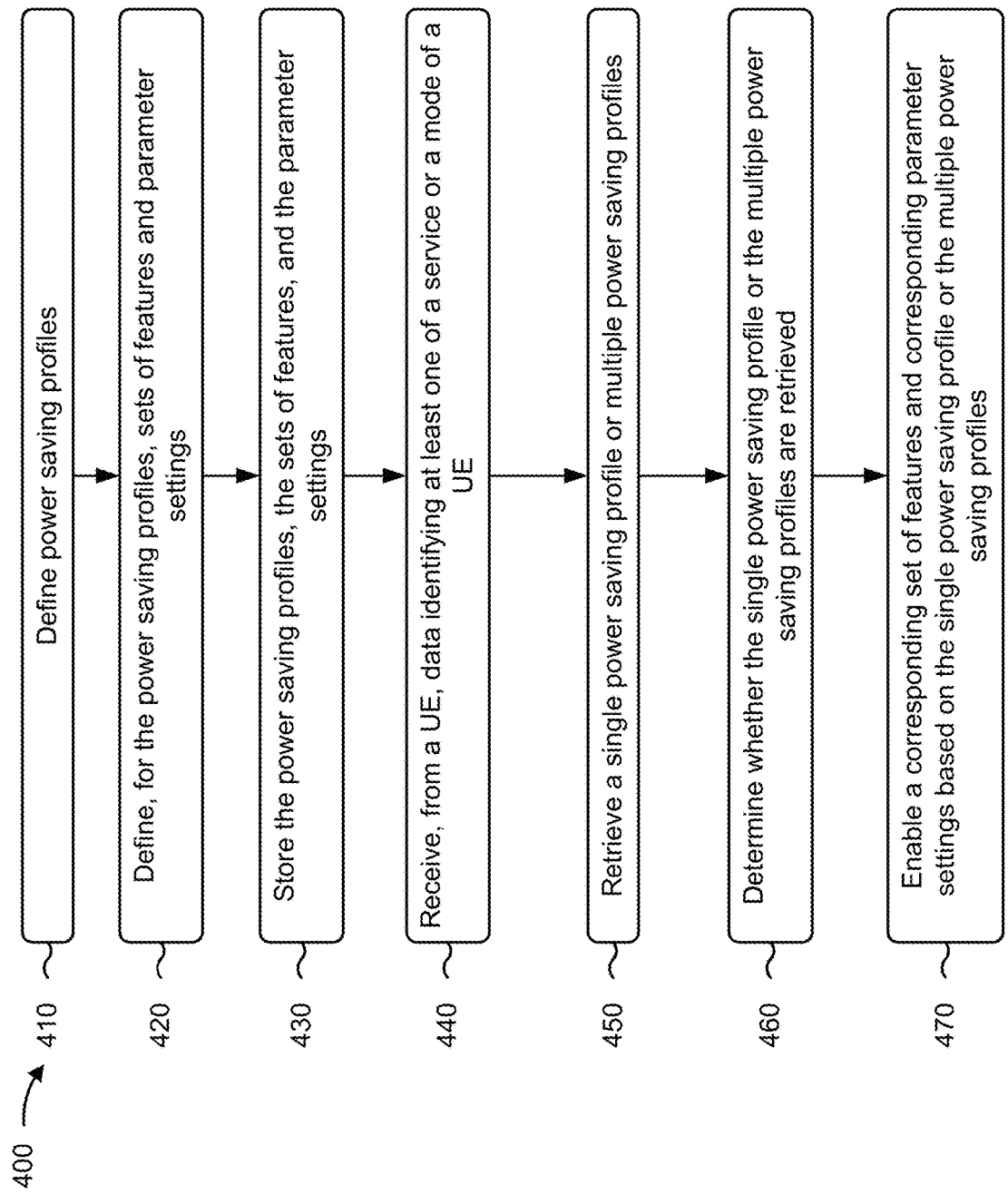

FIG. 4 is a flowchart of an example process 400 for providing power saving profiles for a UE 110. In some implementations, one or more process blocks of FIG. 4 may be performed by a base station (e.g., base station 105). In some implementations, one or more process blocks of FIG. 4 may be performed by another device or a group of devices separate from or including the base station, such as a UE (e.g., UE 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include defining power saving profiles (block 410). For example, the base station may define power saving profiles based on network services, as described above. The base station may include an eNodeB and/or a gNodeB. The power saving profiles may include a power saving profile for a voice service, a power saving profile for URLLC, a power saving profile for eMBB, a power saving profile for a network slice, a power saving profile for an operation mode of the user equipment, a power saving profile for a network service associated with a 5G NR network, and/or a power saving mode for a network service associated with a 4G LTE network.

In some implementations, the power saving profile for the URLLC may include a feature that causes the UE to remain on standalone technology based on the UE being located in an area with the standalone technology and non-standalone technology and/or a feature that causes the UE to utilize connected mode discontinuous reception. In some implementations, the power saving profile for the eMBB may include a feature that causes the UE to remain on non-standalone technology based on the UE being located in an area with standalone technology and the non-standalone technology and based on the non-standalone technology being provided a greater data rate than a data rate provided by the standalone technology and/or a feature that causes the UE to utilize connected mode discontinuous reception.

Alternatively, and/or additionally, the base station may define the power saving profiles based on an operation mode of the UE. The operation mode of the UE may include a first mode associated with the UE operating on a direct power source and/or a second mode associated with the UE operating on a battery.

As further shown in FIG. 4, process 400 may include defining, for the power saving profiles, sets of features and parameter settings (block 420). For example, the base station may define, for the power saving profiles, sets of features and parameter settings for each feature of the sets of features, as described above. The power saving profiles, the sets of features, and/or the parameter settings may be associated with a subscription for the UE.

Alternatively, and/or additionally, the sets of features may include a feature associated with a DRX inactivity timer, a feature associated with a DRX long cycle, a feature associated with a DRX on duration timer, a feature associated with a DRX short cycle, and/or a feature associated with network bandwidth narrowing. The parameter settings for each feature may include first times associated with a DRX inactivity timer, a DRX long cycle, a DRX on duration timer, and a DRX short cycle of a power saving profile for a voice service, second times associated with the DRX inactivity timer, the DRX long cycle, the DRX on duration timer, and the DRX short cycle of a power saving profile for URLLC, third times associated with the DRX inactivity timer, the DRX long cycle, the DRX on duration timer, and the DRX short cycle of a power saving profile for enhanced mobile broadband, fourth times associated with the DRX inactivity timer, the DRX long cycle, the DRX on duration timer, and the DRX short cycle of a power saving profile for a network slice, and/or fifth times associated with the DRX inactivity timer, the DRX long cycle, the DRX on duration timer, and the DRX short cycle of a power saving profile for the operation mode of the user equipment.

As further shown in FIG. 4, process 400 may include storing the power saving profiles, the sets of features, and the parameter settings (block 430). For example, the base station may store the power saving profiles, the sets of features, and the parameter settings in a data structure, as described above.

As further shown in FIG. 4, process 400 may include receiving, from a UE, data identifying at least one of a service or a mode of the UE (block 440). For example, the base station may receive, from a UE, data identifying at least one of a service utilized by the UE or an operation mode of the UE, as described above.

As further shown in FIG. 4, process 400 may include retrieving a single power saving profile or multiple power saving profiles (block 450). For example, the base station may retrieve, from the data structure, a single power saving profile or multiple power saving profiles based on the data identifying the at least one of the service utilized by the UE or the operation mode of the UE, as described above.

As further shown in FIG. 4, process 400 may include determining whether the single power saving profile or the multiple power saving profiles are retrieved (block 460). For example, the base station may determine whether the single power saving profile or the multiple power saving profiles are retrieved from the data structure, as described above.

As further shown in FIG. 4, process 400 may include enabling a corresponding set of features and corresponding parameter settings based on the single power saving profile or the multiple power saving profiles (block 470). For example, the base station may enable, for the UE, a corresponding set of features and corresponding parameter settings of the single power saving profile based on the single power saving profile being retrieved from the data structure, as described above.

In some implementations, the base station may combine features of corresponding sets of features and corresponding parameter settings of the multiple power saving profiles, to generate a new set of features and new parameter settings, based on the multiple power saving profiles being retrieved from the data structure. For example, the base station may apply a rule that causes the combining of the features of the corresponding sets of features and the corresponding parameter settings of the multiple power saving profiles, to generate the new set of features and the new parameter settings. Alternatively, and/or additionally, the base station may apply weights to the multiple power saving profiles to generate multiple weighted power saving profiles and may combine the features of the corresponding sets of features and the corresponding parameter settings, based on the multiple weighted power saving profiles, to generate the new set of features and the new parameter settings. The base station may enable, for the UE, the new set of features and the new parameter settings based on the multiple power saving profiles being retrieved from the data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for providing power saving profiles for a UE. In some implementations, one or more process blocks of FIG. 5 may be performed by a UE (e.g., UE 110). In some implementations, one or more process blocks of FIG. 5 may be performed by another device or a group of devices separate from or including the UE, such as a base station (e.g., base station 105). Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include providing, to a base station, data identifying at least one of a service utilized by the UE or an operation mode of the UE (block 510). For example, the UE may provide, to a base station, data identifying at least one of a service utilized by the UE or an operation mode of the UE, as described above.

As further shown in FIG. 5, process 500 may include receiving, from the base station, a set of features associated with a power saving profile, and parameter settings for each feature of the set of features, based on the data identifying the at least one of the service utilized by the UE or the operation mode of the UE (block 520). For example, the UE may receive, from the base station, a set of features associated with a power saving profile, and parameter settings for each feature of the set of features, based on the data identifying the at least one of the service utilized by the UE or the operation mode of the UE, as described above.

As further shown in FIG. 5, process 500 may include implementing the set of features and the parameter settings of the power saving profile (block 530). For example, the UE may implement the set of features and the parameter settings of the power saving profile, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    defining, by a base station, power saving profiles based on network services;
    defining, by the base station and for the power saving profiles, sets of features and parameter settings for each feature of the sets of features;
    storing, by the base station, the power saving profiles, the sets of features, and the parameter settings in a data structure;
    receiving, by the base station and from a user equipment, data identifying at least one of a service utilized by the user equipment or a mode of the user equipment;
    retrieving, by the base station and from the data structure, a single power saving profile or multiple power saving profiles based on the data identifying the at least one of the service utilized by the user equipment or the mode of the user equipment;
    determining, by the base station, whether the single power saving profile or the multiple power saving profiles are retrieved from the data structure;
    combining, by the base station, features of corresponding sets of features and corresponding parameter settings of the multiple power saving profiles, to generate a new set of features and new parameter settings, based on the multiple power saving profiles being retrieved from the data structure; and
    enabling, by the base station and for the user equipment, the new set of features and the new parameter settings based on the multiple power saving profiles being retrieved from the data structure.

2. The method of claim 1, further comprising:
    applying a rule that combines the features of the corresponding sets of features and the corresponding parameter settings of the multiple power saving profiles, to generate the new set of features and the new parameter settings.

3. The method of claim 1, wherein combining the features of the corresponding sets of features and the corresponding parameter settings of the multiple power saving profiles, to generate the new set of features and the new parameter settings comprises:
    applying weights to the multiple power saving profiles to generate multiple weighted power saving profiles; and
    combining the features of the corresponding sets of features and the corresponding parameter settings, based on the multiple weighted power saving profiles, to generate the new set of features and the new parameter settings.

4. The method of claim 1, wherein the power saving profiles include one or more of:
    a power saving profile for a voice service,
    a power saving profile for ultra-reliable low latency communication,
    a power saving profile for enhanced mobile broadband,
    a power saving profile for a network slice, or
    a power saving profile for the mode of the user equipment.

5. The method of claim 4, wherein the power saving profile for the ultra-reliable low latency communication includes:
    a feature that causes the user equipment to remain on standalone technology based on the user equipment being located in an area with the standalone technology and non-standalone technology, and
    a feature that causes the user equipment to utilize connected mode discontinuous reception.

6. The method of claim 4, wherein the power saving profile for the enhanced mobile broadband includes:
    a feature that causes the user equipment to remain on non-standalone technology based on the user equipment being located in an area with standalone technology and the non-standalone technology and based on the non-standalone technology being provided a greater data rate than a data rate provided by the standalone technology, and
    a feature that causes the user equipment to utilize connected mode discontinuous reception.

7. The method of claim 1, wherein the sets of features include one or more of:

a feature associated with a discontinuous reception (DRX) inactivity timer,
a feature associated with a DRX long cycle,
a feature associated with a DRX on duration timer,
a feature associated with a DRX short cycle, or
a feature associated with network bandwidth narrowing.

8. A base station, comprising:
one or more processors configured to:
define power saving profiles based on network services;
define, for the power saving profiles, sets of features and parameter settings for each feature of the sets of features;
store the power saving profiles, the sets of features, and the parameter settings in a data structure;
receive, from a user equipment, data identifying at least one of a service utilized by the user equipment or an operation mode of the user equipment;
retrieve, from the data structure, a single power saving profile or multiple power saving profiles based on the data identifying the at least of the service utilized by the user equipment or the operation mode of the user equipment;
determine whether the single power saving profile or the multiple power saving profiles are retrieved from the data structure;
enable, for the user equipment, a corresponding set of features and corresponding parameter settings of the single power saving profile based on the single power saving profile being retrieved from the data structure;
combine features of corresponding sets of features and corresponding parameter settings of the multiple power saving profiles, to generate a new set of features and new parameter settings, based on the multiple power saving profiles being retrieved from the data structure; and
enable, for the user equipment, the new set of features and the new parameter settings based on the multiple power saving profiles being retrieved from the data structure.

9. The base station of claim 8, wherein the sets of features include one or more of:
a feature associated with a discontinuous reception (DRX) inactivity timer,
a feature associated with a DRX long cycle,
a feature associated with a DRX on duration timer,
a feature associated with a DRX short cycle, or
a feature associated with network bandwidth narrowing.

10. The base station of claim 8, wherein the parameter settings for each feature include one or more of:
first times associated with a discontinuous reception (DRX) inactivity timer, a DRX long cycle, a DRX on duration timer, and a DRX short cycle of a power saving profile for a voice service,
second times associated with the DRX inactivity timer, the DRX long cycle, the DRX on duration timer, and the DRX short cycle of a power saving profile for ultra-reliable low latency communication,
third times associated with the DRX inactivity timer, the DRX long cycle, the DRX on duration timer, and the DRX short cycle of a power saving profile for enhanced mobile broadband,
fourth times associated with the DRX inactivity timer, the DRX long cycle, the DRX on duration timer, and the DRX short cycle of a power saving profile for a network slice, or
fifth times associated with the DRX inactivity timer, the DRX long cycle, the DRX on duration timer, and the DRX short cycle of a power saving profile for the operation mode of the user equipment.

11. The base station of claim 8, wherein when combining the features of the corresponding sets of features and the corresponding parameter settings of the multiple power saving profiles to generate the new set of features and the new parameter settings, the one or more processors are configured to:
combine the features of the corresponding sets of features and the corresponding parameter settings of the multiple power saving profiles to generate the new set of features and the new parameter settings based on priorities associated with the multiple power saving profiles.

12. The base station of claim 11, wherein the one or more processors are further configured to:
determine a priority for a particular power saving profile, of the multiple power saving profiles, based on a reduction in power consumption associated with the particular power saving profile.

13. The base station of claim 8, wherein the operation mode of the user equipment includes one of:
a first mode associated with the user equipment operating on a direct power source, or
a second mode associated with the user equipment operating on a battery.

14. The base station of claim 8, wherein the power saving profiles, the sets of features, and the parameter settings are associated with a subscription for the user equipment.

15. A non-transitory computer-readable medium storing a set of instructions, the set of instructions comprising:
one or more instructions that, when executed by one or more processors of a base station, cause the base station to:
store in a data structure:
power saving profiles that are based on network services,
sets of features defined for the power saving profiles, and
parameter settings for each feature of the sets of features;
receive, from a user equipment, data identifying at least one of a service utilized by the user equipment or an operation mode of the user equipment;
retrieve, from the data structure, a single power saving profile or multiple power saving profiles based on the data identifying the at least one of the service utilized by the user equipment or the operation mode of the user equipment;
determine whether the single power saving profile or the multiple power saving profiles are retrieved from the data structure;
enable, for the user equipment, a corresponding set of features and corresponding parameter settings of the single power saving profile based on the single power saving profile being retrieved from the data structure;
combine features of corresponding sets of features and corresponding parameter settings of the multiple power saving profiles, to generate a new set of features and new parameter settings, based on the multiple power saving profiles being retrieved from the data structure; and enable, for the user equipment, the new set of features and the new parameter settings based on the multiple power saving profiles being retrieved from the data structure.

16. The non-transitory computer-readable medium of claim 15, wherein the one or more instructions, that cause the base station to combine the features of the corresponding sets of features and the corresponding parameter settings of the multiple power saving profiles, to generate the new set of features and the new parameter settings, cause the base station to:
    apply a rule that causes the combining the features of the corresponding sets of features and the corresponding parameter settings of the multiple power saving profiles, to generate the new set of features and the new parameter settings.

17. The non-transitory computer-readable medium of claim 15, wherein the one or more instructions, that cause the base station to combine the features of the corresponding sets of features and the corresponding parameter settings of the multiple power saving profiles, to generate the new set of features and the new parameter settings, cause the base station to:
    apply weights to the multiple power saving profiles to generate multiple weighted power saving profiles; and
    combine the features of the corresponding sets of features and the corresponding parameter settings, based on the multiple weighted power saving profiles, to generate the new set of features and the new parameter settings.

18. The non-transitory computer-readable medium of claim 15, wherein the power saving profiles include one or more of:
    a power saving profile for a voice service,
    a power saving profile for ultra-reliable low latency communication,
    a power saving profile for enhanced mobile broadband,
    a power saving profile for a network slice, or
    a power saving profile for the operation mode of the user equipment.

19. The non-transitory computer-readable medium of claim 15, wherein the sets of features includes one or more of:
    a feature associated with a discontinuous reception (DRX) inactivity timer,
    a feature associated with a DRX long cycle,
    a feature associated with a DRX on duration timer,
    a feature associated with a DRX short cycle, or
    a feature associated with network bandwidth narrowing.

20. The non-transitory computer-readable medium of claim 15, wherein the parameter settings for each feature include one or more of:
    first times associated with a discontinuous reception (DRX) inactivity timer, a DRX long cycle, a DRX on duration timer, and a DRX short cycle of a power saving profile for a voice service,
    second times associated with the DRX inactivity timer, the DRX long cycle, the DRX on duration timer, and the DRX short cycle of a power saving profile for ultra-reliable low latency communication,
    third times associated with the DRX inactivity timer, the DRX long cycle, the DRX on duration timer, and the DRX short cycle of a power saving profile for enhanced mobile broadband,
    fourth times associated with the DRX inactivity timer, the DRX long cycle, the DRX on duration timer, and the DRX short cycle of a power saving profile for a network slice, or
    fifth times associated with the DRX inactivity timer, the DRX long cycle, the DRX on duration timer, and the DRX short cycle of a power saving profile for the operation mode of the user equipment.

\* \* \* \* \*